United States Patent [19]
Kang

[11] Patent Number: 5,082,448
[45] Date of Patent: Jan. 21, 1992

[54] ROTATABLE ELECTRICAL CONNECTOR

[76] Inventor: Steve Kang, No. 49, Lane 81, Lee Sinn Road, Sec 2, Sanchung City Taipei Hsien, Taiwan, Taiwan

[21] Appl. No.: 708,454

[22] Filed: May 31, 1991

Related U.S. Application Data

[63] Continuation-in-part of Ser. No. 369,323, Jun. 21, 1989, Pat. No. 4,932,882.

[51] Int. Cl.$^5$ .................................................. H01R 39/00
[52] U.S. Cl. ........................................ 439/22; 439/21; 439/676
[58] Field of Search ................. 439/13, 18, 20-22, 439/27, 29, 676

[56] References Cited

U.S. PATENT DOCUMENTS

| | | | |
|---|---|---|---|
| 4,590,337 | 5/1986 | Engelmore | 439/21 |
| 4,699,591 | 10/1987 | Gallo et al. | 439/21 |
| 4,764,121 | 8/1988 | Ditzig | 439/21 |
| 4,932,882 | 6/1990 | Kang | 439/22 |

Primary Examiner—Eugene F. Desmond
Attorney, Agent, or Firm—Notaro & Michalos

[57] ABSTRACT

A connector to prevent tangling of a cord having modular plug at its end which is to be connected to a telephone handset. The connector includes a first part which is rotatable relative to a second part. A circular printed circuit board with circuit conductors laid thereon is mounted on a mounting base of the first part. The modular plug with its conductive laminates which are in contact with the circular circuit conductors on its rear surface is extended from the mounting base. The second part includes a shell having a plurality of holes therein in line with the circuit conductors. A wire guide is pressed onto the top portion of the shell. The wire guide and shell form and acute inclined angle receptacle for accepting a modular type plug which is separate from the connector. Spring wire contact elements fixed inside the wire guide are electrically connected to a plurality of spring loaded contact assemblies. Each of the spring loaded contact assemblies is inserted through the respective hole and then contact one circuit conductor on its front surface. This makes individual electrical contact between the circuit conductors and respective spring wire contact elements.

1 Claim, 2 Drawing Sheets

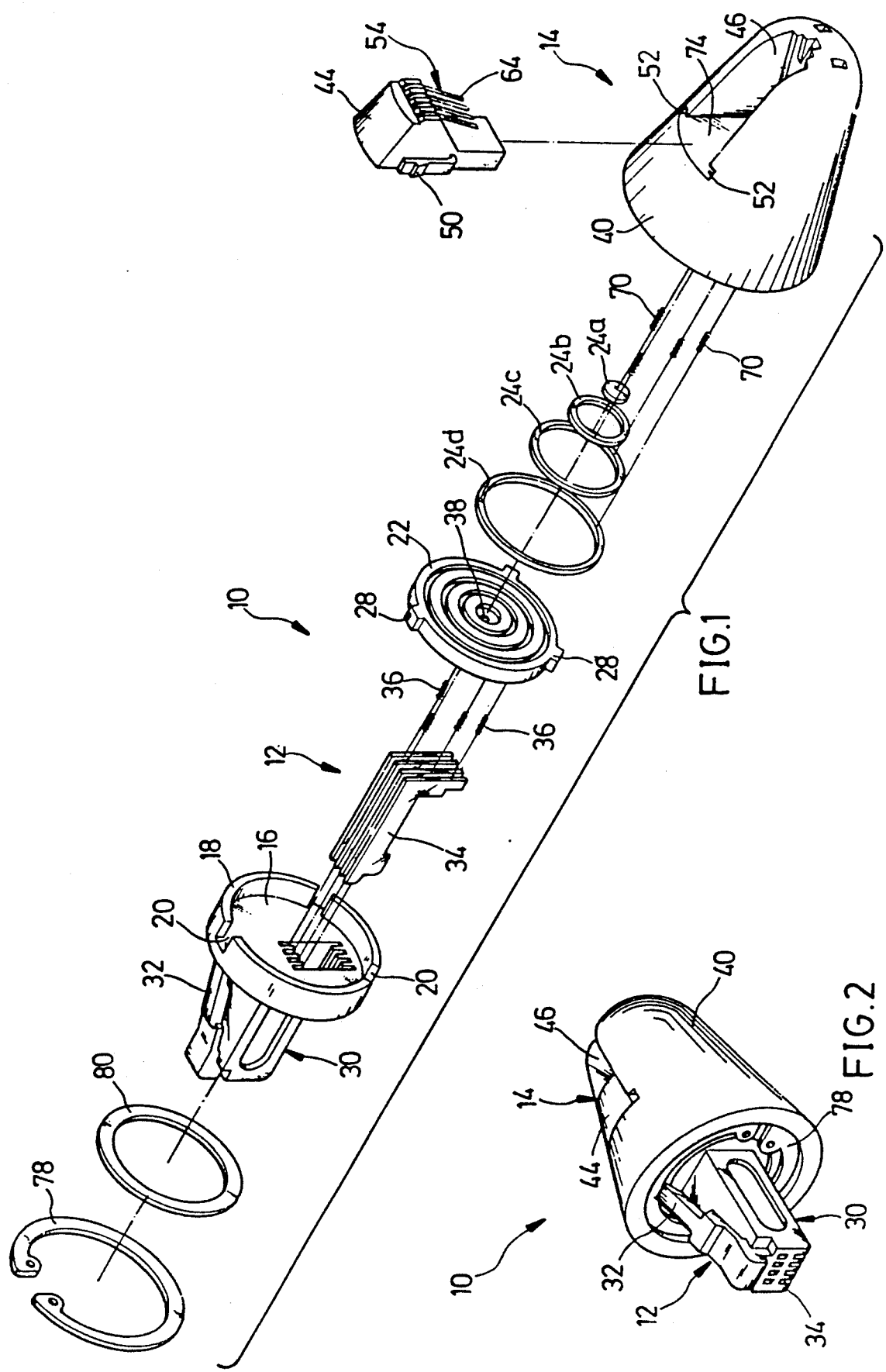

ROTATABLE ELECTRICAL CONNECTOR

CROSS REFERENCE TO THE RELATED APPLICATIONS

This application is a continuation-in-part of parent application, Ser. No. 369,323, filed June 21, 1989, now U.S. Pat. No. 4,932,882.

BACKGROUND OF THE INVENTION

The present invention relates to connectors which are capable of rotary movement and particularly connectors which are useful for telephone handsets and other similar devices.

The power cords used with a wide variety of hand-held appliances tend to become twisted and kinked with use as a result of the manipulation of the appliance. Similarly, telephone cords which connect the handset to the instrument and the instrument to the wall outlet develop twists and kinks in use. To prevent this twisting and the resultant kinking of the cord, a rotary connector may be provided, either in conjunction with one of the terminating plugs of the cords or as a separate member inserted at a point along the length of the cord. Prior art examples of such devices are disclosed in the following U.S. Pat. Nos.: 1,098,501: Holdaway et al.; 1,174,379: Bacon; 2,134,355: Caldwell; 2,288,259: Gladulich; 2,721,822: Pritkin; 2,898,572: Shinn; 3,479,632: Galles; 4,061,381: Smal; 4,472,010: Parmello; 4,533,796: Engelmore; 4,583,798: Blazowich; 4,590,337: Engelmore; 4,699,597: Gallo et al.

SUMMARY OF THE INVENTION

An object of the present invention is to provide a rotatable connector having two parts which are rotatable with respect to each other, one of the parts having an entry portion for a modular plug to which a wire is attached which is at an inclined angle to the exit portion of the other half which has a modular plug for insertion into another modular receptacle.

Another object of the present invention is to provide a small size rotatable electrical connector for use with coiled telephone cords so as to prevent the cord from becoming twisted and knotted-up.

A further object of the present invention is to provide a rotatable connector having two parts in which the rotational electrical connection is provided by each of a plurality of spring wire contact elements riding on a respective conductive track of a printed circuit board.

An additional object of the present invention is to provide a rotatable connector for a telephone handset or similar device.

BRIEF DESCRIPTION OF THE DRAWINGS

Other objects and advantages of the present invention will become more apparent upon reference to the following detailed description and annexed drawings in which:

FIG. 1 is an exploded view of a practical embodiment of the rotatable electrical connector of the present invention;

FIG. 2 is an external view of the connector when assembled;

DETAILED DESCRIPTION OF THE PREFERRED EMBODIMENT

Figure 3:
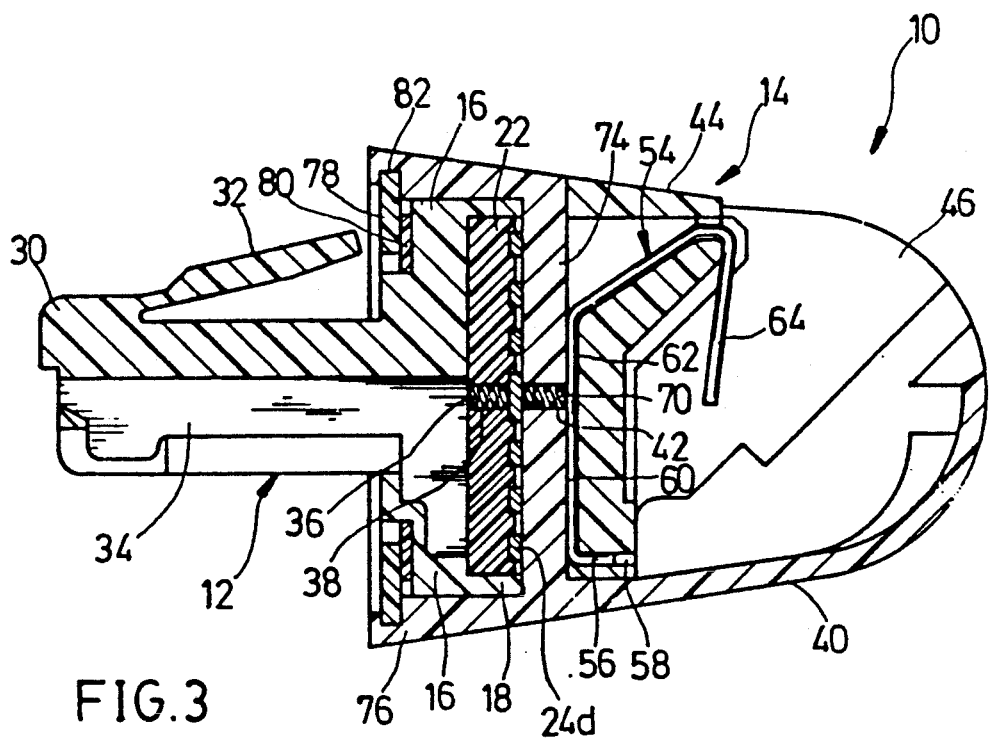
FIG. 3 is a view in cross-section, on an enlarged scale, of the connector.

Referring to FIGS. 1, 2 and 3, the preferred embodiment of the rotatable electrical connector generally designated 10 includes respective male and female parts 12 and 14 which can rotate relative to each other. The male part 12 includes a mounting base 16 having a raised peripheral lip 18 extending from its front face. The lip 18 has a plurality of notches 20, three of which are illustratively shown, although more or less can be used. A circular printed circuit board 22 with suitable circuit conductors 24a to 24d laid thereon is mounted on the mounting base 16. The board 22 has a circular central conductive pad area 24a and three concentric surrounding circular tracks 24b, 24c and 24d of progressively increasing diameter. There are three indexing fingers 28 on its outer surface, and these fingers 28 are adopted to mate within the notches 20 of the base 16, so that the circuit board 22 can be mounted on base 16.

A conventional modular plug 30 having the usual lever latch 32 thereon is extended from the rear face of the mounting base 16. The plug 30 has the usual set of conductive laminates 34 which are in contact with a set of corresponding spring type contacts (not shown) in a modular receptacle (not shown) of a telephone handset (not shown). Front ends of the conductive laminates 34 contact respective a first plurality of spring loaded contact assemblies 36 which penetrate a first plurality of holes 38 in the circuit board 22. Each of the first contact assemblies 36 is inserted through the respective hole 38 and then contacts one of circuit conductors 24a to 24d on its rear surface. This makes individual electrical contact between the conductive laminates 34 and respective circuit conductors 24a to 24d.

Figure 4:
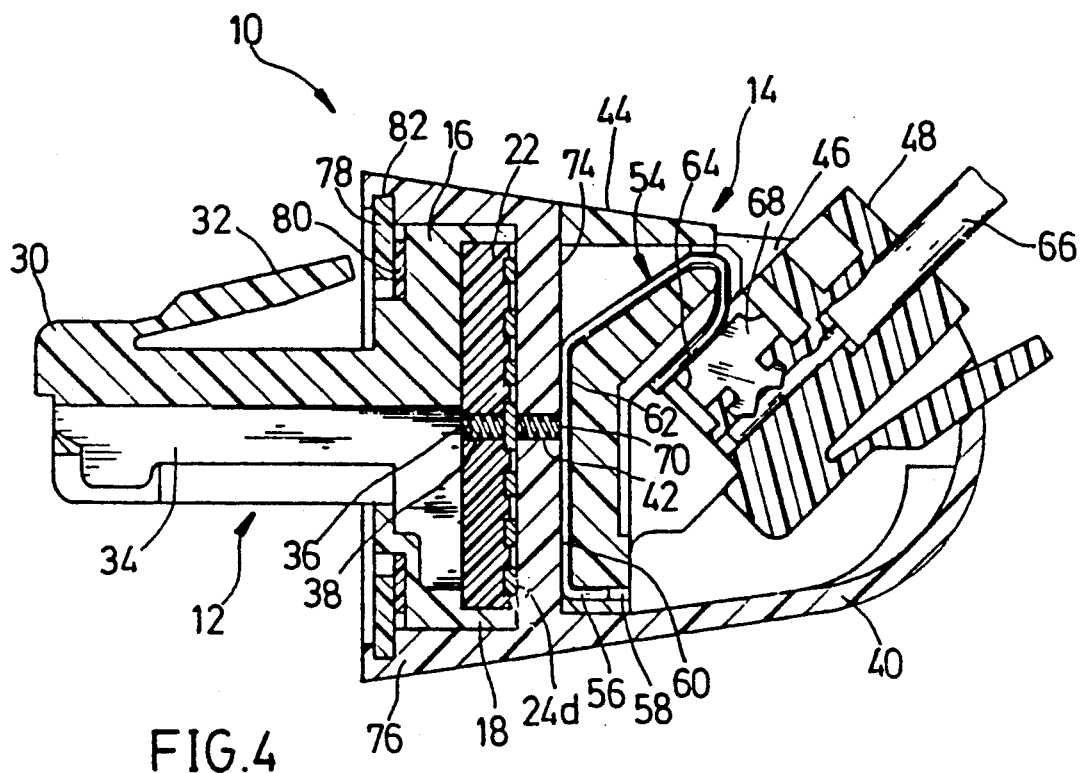
FIG. 4 is a cross-sectional view similar to FIG. 3 but showing a conventional modular plug to be inserted into a receptacle of the connector.

The female part 14 of the connector 10 includes a shell 40 having a series of four holes 42 therein in line with the four tracks 24a to 24d on the front face of the printed circuit board 22. A wire guide 44 is pressed onto the top portion of the shell 40. The wire guide 44 and shell 40 form an inclined angle receptacle 46 for accepting a modular type plug 48 (as shown in FIG. 4) which is separate from the connector 10. There are two lever latches 50 on the side surfaces of the wire guide 44, and these lever latches 50 are adapted to mate within the notches 52 of the shell 40, so that the wire guide 44 can be mounted on the shell 40. The wire guide 44 is of insulating material, and it is fitted with a plurality of spring wire contact elements 54. The plurality of spring wire contact elements 54 is arranged in a parallel vertical array, as viewed in FIG. 1. The plurality of spring wire contact elements 54 is generally C-shaped, as best seen in FIG. 3. Each spring wire contact 54 is identical, and it has a lower leg 56 at one end that is inserted into a mating hole 58 of the wire guide 44. The intermediate portion 60 of each C-shaped spring wire contact 54 is then bent over into a respective channel 62 formed on the hollow portion of the wire guide 44. As shown in FIG. 4, the upper leg 64 of each C-shaped spring wire contact 54 is respectively bent into the receptacle 46 to serve as the spring contact for the external modular plug 48 having the usual conductors 66 therein with leads which have the respective contacts 68. Front ends of the circuit conductors 24a to 24d contact respective second plurality of spring loaded contact assemblies 70 which penetrate a second plurality of holes 42 in the base 74 of the shell 40. Each of the second plurality of spring loaded contact assemblies 70 is inserted through the respective hole 42 and then contacts one spring wire contact element 54 on its intermediate portion 60. This makes individual electrical contact between the circuit conductors 24a to 24d and respective spring wire contact elements 54.

As seen in FIGS. 1, 2 and 3, the shell 40 of the female part 14 has a stepped lower and 76 and is held to the front surface of the mounting base 16 of the male part 12 by a C-clamp 78 with an intermediate bearing washer 80 which can be of plastic, fiber or any other suitable material. The C-clamp 78 is inserted into a ring groove 82 which formed on the inner surface of the shell 40.

As seen from FIG. 4, the plug 30 on male part 12 of the rotary connector plugs into the receptacle of the telephone handset (not shown) and the female part 14 provides receptacle 46 for the modular plug 48 to which the telephone cord 66 is connected. The receptacle 46 is at an inclined angle to plug 30. The two parts 12 and 14 are held together by the C-clamp 78 which prevents them from separating. However, the female half 14 can be rotated freely about the male half 12, i.e., the shell 40 has a rotating clearance relative to the mounting base 16 of the male part 12.

In the present invention, the telephone cord 66 enters at an acute inclined angle of about 45 degrees relative to the connector's longitudinal axis. Thus, as someone moves the telephone handset or the cord 66, instead of the cord 66 coiling or "winding up", turning force is provided for the connector female part 14 to overcome any friction between the male and female parts and causing the female part 14 to rotate relative to the male part 12. That is, the connector 10 uses the leverage from the cord or the handset which are at inclined angles to each other to cause relative rotation of the two connector parts.

As should be apparent, electrical contact is provided between each of the wires of the cord 66 through a respective contact 68 of the modular plug 48 and the C-shaped spring wire contact 54 and the tip of a second spring loaded contact assembly 70. The rotatable contact is maintained between the two connector parts by the tips of the spring loaded contact assemblies 70 riding on the conductive tracks 24a to 24d of the printed circuit board 22. Thereafter the conductive laminates 34 contacted through the first spring loaded contact assemblies 36 and the conductive tracks 24a to 24d enter the male modular plug 30 and the end of each laminate is provided with an electrical terminal which makes contact with spring type terminal of the modular receptacle of the handpiece.

In the construction of the connector 10, all of the mounting base 16, printed circuit board 22, modular plug 30, shell 40, wire guide 44, base 74. C-clamp 78 and washer 80 are of any suitable insulating material and are preferably molded of a plastic material.

Modifications of this invention will occur to those skilled in this art. Therefore, it is to be understood that this invention is not limited to the particular embodiment disclosed, but that it is intended to cover all modifications which are within the true spirit and scope of this invention as claimed.

What is claimed is:

1. A rotatable electrical connector for a telephone handset having a first part and a second part which are rotatable with respect to each other, comprising:

said first part including a mounting base for receiving a circular printed circuit board with a plurality of circular circuit conductors laid thereon, said mounting base having a modular plug thereon for connection to said handset, said modular plug having a plurality of conductive laminates for electrically contacting respectively a first plurality of spring loaded contact assemblies, said first plurality of spring loaded contacts penetrating a first plurality of holes in said printed circuit board and then electrically contacting respective said circuit conductors;

said second part coupled to said first part for rotation relative to said first part about a central axis common to said first and second parts, said second part including a shell having a second plurality of holes therein in line with said circuit conductors, said shell having a top portion for receiving a wire guide, said wire guide and shell defining a receptacle thereon which are located on said second part at an acute inclined angle displaced from said common axis preferably by substantially about 45 degrees to accept at said inclined angle from said common axis an external modular plug having a cord attached thereto which can be twisted, said wire guide is fitted with a plurality of spring wire contact elements which is generally C-shaped to serve as the spring contact for said external modular plug, said C-shaped spring wire contact elements electrically contacting respectively a second plurality of spring loaded contact assemblies which penetrate said second plurality of holes in said shell and then electrically contacting respective said circuit conductors of said printed circuit board; and a C-clamp for retaining said mounting base for rotation in said shell and for holding said circuit conductors in moveable contact with one of said spring wire contact elements.

* * * * *